US010846477B2

(12) United States Patent
Lee et al.

(10) Patent No.: US 10,846,477 B2
(45) Date of Patent: Nov. 24, 2020

(54) METHOD AND APPARATUS FOR RECOMMENDING WORD

(71) Applicant: SAMSUNG ELECTRONICS CO., LTD., Suwon-si (KR)

(72) Inventors: Hae-jun Lee, Yongin-si (KR); Seung-hak Yu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 125 days.

(21) Appl. No.: 15/954,931

(22) Filed: Apr. 17, 2018

(65) Prior Publication Data

US 2018/0336176 A1 Nov. 22, 2018

Related U.S. Application Data

(60) Provisional application No. 62/506,763, filed on May 16, 2017.

(30) Foreign Application Priority Data

Nov. 20, 2017 (KR) ........................ 10-2017-0154976

(51) Int. Cl.
*G06F 40/274* (2020.01)
*G06F 3/0482* (2013.01)
(Continued)

(52) U.S. Cl.
CPC .......... *G06F 40/274* (2020.01); *G06F 3/0237* (2013.01); *G06F 3/0482* (2013.01);
(Continued)

(58) Field of Classification Search
CPC ..... G06F 17/276; G06F 3/0482; G06F 17/277
(Continued)

(56) References Cited

U.S. PATENT DOCUMENTS 9,852,215 B1 * 12/2017 Sullivan ................ G06F 16/335
2005/0104869 A1 * 5/2005 Chung .................... G06F 3/018
345/179
(Continued)

FOREIGN PATENT DOCUMENTS

KR          10-0511247         8/2005
KR       10-2005-0106613      11/2005
KR       10-2007-0043673       4/2007

OTHER PUBLICATIONS

T. Ciloglu et al., "Language modelling for Turkish as an agglutinative language", Signal Processing and Communications Applications Conference, 2004. Proceedings of the IEEE 12th, 2004, pp. 461-462.
(Continued)

*Primary Examiner* — Jakieda R Jackson
(74) *Attorney, Agent, or Firm* — Nixon & Vanderhye P.C.

(57) ABSTRACT

Provided is a device including a memory storing information about sequences of a plurality of registered words; an input unit comprising input circuitry configured to receive an input of a text comprising a first eojeol not belonging to the plurality of registered words, wherein, in the first eojeol, a first word is attached to a first registered word that belongs to the plurality of registered words; and a controller configured to detect the first registered word from the first eojeol, to determine a predicted eojeol to be input after the text, based on the information about the sequences of the plurality of registered words and the detected first registered word and to control a display to display the predicted eojeol.

16 Claims, 10 Drawing Sheets

(51) Int. Cl.
*G06F 3/023* (2006.01)
*G06F 40/53* (2020.01)
*G06F 40/216* (2020.01)
*G06F 40/253* (2020.01)
*G06F 40/268* (2020.01)
*G06F 40/284* (2020.01)

(52) U.S. Cl.
CPC .......... *G06F 40/216* (2020.01); *G06F 40/253* (2020.01); *G06F 40/268* (2020.01); *G06F 40/284* (2020.01); *G06F 40/53* (2020.01)

(58) Field of Classification Search
USPC .......................................................... 704/9
See application file for complete search history.

(56) References Cited

U.S. PATENT DOCUMENTS

| | | | | |
|---|---|---|---|---|
| 2006/0136208 | A1* | 6/2006 | Chung | G10L 15/1822 704/251 |
| 2007/0100890 | A1* | 5/2007 | Kim | G06F 3/018 |
| 2007/0162562 | A1* | 7/2007 | Kwon | G06F 16/9566 709/218 |
| 2009/0094145 | A1* | 4/2009 | Kim | G06Q 30/02 705/34 |
| 2009/0326927 | A1* | 12/2009 | Morin | G06F 40/274 704/10 |
| 2010/0169095 | A1* | 7/2010 | Asano | G10L 15/1822 704/251 |
| 2014/0278368 | A1* | 9/2014 | Skory | G06F 17/22 704/9 |
| 2015/0347383 | A1* | 12/2015 | Willmore | G06F 40/274 704/9 |
| 2016/0111089 | A1* | 4/2016 | Kim | G06F 3/018 |
| 2016/0328380 | A1* | 11/2016 | Yao | G06F 17/2755 |
| 2017/0171151 | A1* | 6/2017 | Raemy | G06Q 30/02 |
| 2017/0286403 | A1* | 10/2017 | Popescu | G06F 40/30 |
| 2018/0113852 | A1* | 4/2018 | Song | G06F 17/276 |
| 2018/0174043 | A1* | 6/2018 | Po | G16H 50/20 |
| 2018/0300400 | A1* | 10/2018 | Paulus | G06F 40/58 |

OTHER PUBLICATIONS

Q. Cui et al., "Learning Effective Word Embedding using Morphological Word Similarity", arXiv: 1407.1687v1, uploaded Feb. 8, 2015, 17 pages.
Y. Kim et al., "Character-aware Neural Language Models", arXiv: 1508.06615v4, Dec. 1, 2015, 9 pages.
T. Mikolov et al., "Subword Language Modeling with Neural Networks", preprint (http://www.fit.vutbr.cz/imikolov/rnnlm/char.pdf), 4 pages.
A. E.-D. Mousa. et al., "Morpheme-based Feature-rich Language Models using Deep Neural Networks for LVCSR of Egyptian Arabic", Acoustics, Speech and Signal Processing (ICASSP), 2013 IEEE International Conference, 2013, pp. 8435-8439.
S. Gupta et al., "Distributed Representations of Words to Guide Bootstrapped Entity Classifers", Department of Computer Science Stanford University, 2014, 6 pages.
W. Zaremba et al., "Recurrent Neural Network Regularization", arXiv: 1409.2329v5, Feb. 19, 2015, 8 pages.
W. Chen et al., "Strategies for Training Large Vocabulary Neural Language Models", arXiv:1512.04906v1, Dec. 15, 2015, 13 pages.
S. Vijayanarasimhan et al., "Deep Networks with Large Output Spaces", arXiv: 1412.7479v4, Apr. 10, 2015, 9 pages.
R. Sennrich et al., "Neural Machine Translation of Rare Words with Subword Units", arXiv: 1508.07909v5, Jun. 10, 2016, 11 pages.
E. Grave et al., Efficient Softmax Approximation for GPUs, arXiv: 1609.04309v3, Jun. 19, 2017, 9 pages.
R. Cotterell et al., "Morphological Word-Embeddings", HLT-NAACL, May 2015, pp. 1287-1292.
X. Chen et al., "Joint Learning of Character and Word Embeddings", Twenty-Fourth International Joint Conference on Artificial Intelligence, 2015, 7 pages.
A. Alexandrescu et al., "Factored Neural Language Models", Proceedings of the Human Language Technology Conference of the NAACL, Companion vol. Short Papers, 2006, 4 pages.

* cited by examiner

METHOD AND APPARATUS FOR RECOMMENDING WORD

CROSS-REFERENCE TO RELATED APPLICATIONS

This application is based on and claims priority under 35 U.S.C. § 119 to U.S. Provisional Patent Application No. 62/506,763, filed on May 16, 2017, in the U.S. Patent and Trademark Office, and Korean Patent Application No. 10-2017-0154976, filed on Nov. 20, 2017, in the Korean Intellectual Property Office, the disclosures of which are incorporated by reference herein in their entireties.

BACKGROUND

1. Field

The disclosure relates to a method and apparatus for recommending a word to be input, based on a text input by a user.

2. Description of Related Art

In agglutinative languages including the Korean language, the Japanese language, the Turkish language, or the like, different words may be derived using various affixes that may be attached to a given word. For example, as shown in Table 1 below, at least 10 words may be created by changing 'geu(he)'.

TABLE 1

| Korean words | morphemes | English words |
|---|---|---|
| geuga | geu + ga | he |
| geuneun | geu + neun | he |
| geuege | geu + ege | to him |
| geudo | geu + do | him (he) also |
| geureul | geu + reul | him |
| geuui | geu + ui | his |

Because a word is used to derive many words by using affixes in an agglutinative language, the number of words or syllables is significantly larger than that of other languages.

Because there is such a large number of words or syllables, a large amount of data is required to create a language model, and it is difficult to recommend an exact word.

SUMMARY

Provided are various embodiments for recommending a next syllable, based on an input syllable, even if there is no information about the input syllable.

Additional aspects will be set forth in part in the description which follows and, in part, will be apparent from the description, or may be learned by practice of the presented embodiments.

In accordance with an example aspect of the disclosure, a device includes a memory storing information about sequences of a plurality of registered words; an input unit comprising input circuitry configured to receive an input of a text comprising a first eojeol not belonging to the plurality of registered words, wherein, in the first eojeol, a first word is attached to a first registered word that belongs to the plurality of registered words; and a controller configured to detect the first registered word from the first eojeol, to determine a predicted eojeol to be input after the text, based on the information about the sequences of the plurality of registered words and the detected first registered word and to control a display to display the predicted eojeol.

The controller may be further configured to detect the first registered word from the first eojeol by applying a plurality of filters corresponding to the plurality of registered words to a plurality of syllables forming the first eojeol.

The controller may be further configured to detect at least one registered word comprising the first registered word from the text, and determine a registered word as the predicted eojeol, based on the information about the sequences of the plurality of registered words, wherein the registered word has a highest probability of being input after a sequence of the at least one registered word from among the plurality of registered words.

The controller may be further configured to determine an eojeol using a neural network algorithm, wherein the eojeol has a highest probability of being input after the sequence of the at least one registered word from among the plurality of registered words.

The input unit may be further configured to receive an input of inputting a next eojeol of the text, and the controller may be further configured to modify and refine parameters of the neural network algorithm for a neural network in such a manner that, when the sequence of the at least one registered word detected from the text is input as an input value to the neural network, the next eojeol may be output as an output value from the neural network.

The controller may be further configured to determine the predicted eojeol to be input after the text, based on the first registered word detected from the first eojeol and at least one morpheme comprised in the first eojeol.

The controller may be further configured to determine a plurality of predicted eojeols to be input after the text, based on the information about the sequences of the plurality of registered words and the detected first registered word, and the display may be further configured to display a menu for receiving an input of selecting one of the plurality of predicted eojeols, and when a user input of selecting an eojeol from among the plurality of predicted eojeols is received, the controller may be further configured to input the selected eojeol after the text.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Hereinafter, terms that are used in the disclosure will be briefly described, and the present disclosure will be described in greater detail.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

Throughout the specification, when a part "includes" or "comprises" an element, unless there is a particular description contrary thereto, the part can further include other elements, not excluding the other elements. Throughout the specification, terms such as "unit" and "module" indicate a unit for processing at least one function or operation, wherein the unit and the module may be embodied as hardware or software or embodied by combining hardware and software.

As used herein, the term "and/or" includes any and all combinations of one or more of the associated listed items. Expressions such as "at least one of," when preceding a list of elements, modify the entire list of elements and do not modify the individual elements of the list.

A word may refer, for example, to a unit of a language which may be independently used, may correspond thereto, or may indicate a grammatical function. For example, in a sentence "Joni jeinui ilgireul ilgeun geot gatda (John seems to have read Jane's diary)", words include 'jon (John)', 'jein (Jane)', 'ilgi (diary)', ' ilgeun (have read)', and 'gatda (seems to)', and may also include 'i' that is a subjective postposition, 'ui' that is a possessive postposition, 'reul' that is an objective postposition, and 'geot' that is a dependent noun.

Throughout the disclosure, the term 'eojeol' may refer to a cluster of words, which is distinguished from another cluster by a space in a sentence. For example, in the sentence "Joni jeinui ilgireul ilgeun geot gatda (John seems to have read Jane's diary)", the eojeols are 'joni (John)', 'jeinui (Jane's)', 'ilgireul (diary)', ' ilgeun (have read)', 'geot', and 'gatda (seems to)'.

The eojeol may include only one word or combined words.

A registered word may refer, for example, to a word or phrase which has been registered in a language dictionary forming a language model.

A morpheme may refer, for example, to the smallest meaningful unit of a language. For example, in the sentence 'Cheolsooga iyagi chaegeul ilgeotda (Cheolsoo read a story book', morphemes may be 'Cheolsoo (Cheolsoo)', 'ga', 'iyagi (story)', 'chaeg (book)', 'eul', 'il (read)', 'geot', and 'da'.

Figure 1:
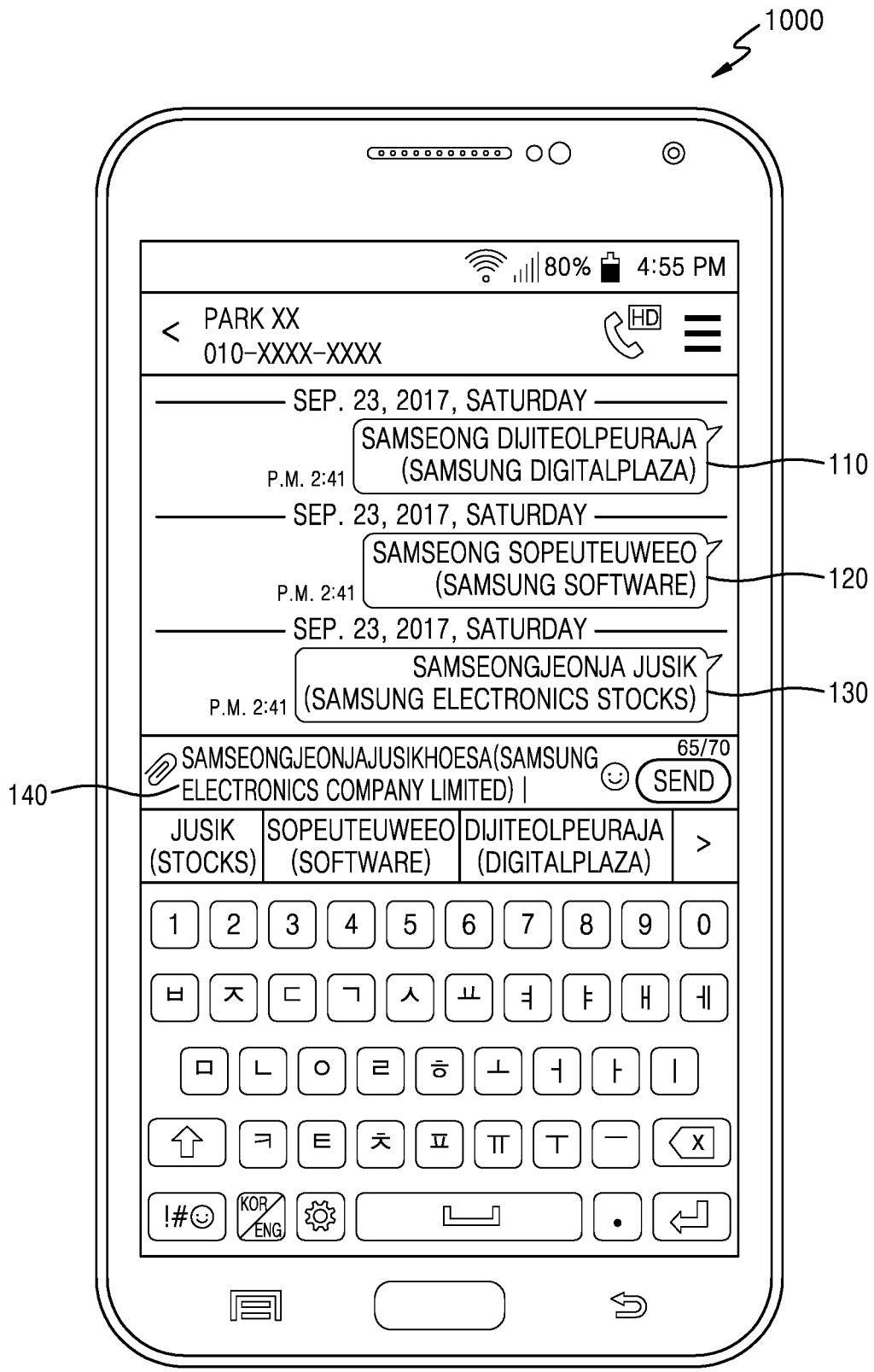
FIG. 1 is a diagram illustrating a method, performed by a device, of recommending an eojeol to be input after a previously-input text, based on a text input by a user, according to various example embodiments.

FIG. 1 is a diagram illustrating a method, performed by a device 1000, of recommending an eojeol to be input after a previously-input text, based on a text input by a user of the device 1000, according to various example embodiments.

The device 1000 may recommend a predicted eojeol based on a language model.

The language model may indicate probability information about sequences of a plurality of registered words included in a language dictionary. For example, when the language dictionary includes registered words of 'Cheolsooga (Cheolsoo)', 'hakgyoe (to school)', and 'gatda (went)', the language model may be a model for calculating probabilities of 6 sequences that are 'Cheolsooga hakgyoe gatda', 'Cheolsooga gatda hakgyoe', 'hakgyoe Cheolsooga gatda', 'hakgyoe gatda Cheolsooga', 'gatda Cheolsooga hakgyoe', and 'gatda hakgyoe Cheolsooga'.

When the device 1000 receives a sentence, the device 1000 may train the language model, based on the received sentence. For example, the device 1000 may include a eojeol as a registered word in the language dictionary, the eojeol being from among eojeols in the received sentence and not existing in the language dictionary, and may modify and refine probability information of the language model.

For example, in the case that the sequence of 'Cheolsooga hakgyoe gatda(Cheolsoo went to school)' is most frequently input, the device 1000 may modify and refine the language model to have a highest probability with respect to the sequence of 'Cheolsooga hakgyoe gatda (Cheolsoo went to school)' from among the 6 sequences.

In addition, the device 1000 may generate or modify and refine the language model by using an n-gram method or a neural network method, but the present disclosure is not limited thereto.

Accordingly, the device 1000 may perform voice recognition or machine translation using the language model. For example, when the device 1000 receives an input of a voice from a user, the device 1000 may determine a sequence of m eojeols where m is a positive integer greater than 1, and may determine whether the determined sequence is appropriate, based on a probability corresponding to the sequence of m eojeols.

When at least one eojeol is input, the device 1000 may determine a predicted eojeol to be input after a most recently input eojeol. For example, the device 1000 may determine a probability of each of a plurality of registered words included in the language dictionary, the probability of being input after the most recently input eojeol, and may determine a registered word having a highest probability from among the plurality of registered words to be a predicted eojeol.

The device 1000 may perform, by using the language model, not only voice recognition, language translation, and prediction of a word to be input, but also may perform tagging of parts of speech, analysis of syntax, recognition of handwriting, correction of typographical errors, and a search for information.

Referring to FIG. 1, even if the at least one input eojeol does not exist in the language dictionary, the device 1000 may recommend a predicted eojeol to be input after the most recently input input eojeol.

For example, when the device 1000 receives a text 'samseong dijiteolpeuraja (Samsung digitalplaza)' 110, a text 'samseong sopeuteuweeo (Samsung software)' 120, and a text 'samseongjeonja jusik (Samsung electronics stocks)' 130, the device 1000 may modify and refine the language model, based on the received texts. For example, in the case that the language dictionary includes only 'samseong (Samsung)' and 'samseong jeonja (Samsung electronics)' and does not include 'samseongjeonjajusikhoesa (Samsung electronics company)', the device 1000 may modify and refine the language model such that a probability that an eojeol 'dijiteolpeuraja (digitalplaza)' or 'sopeuteuweeo (software)' is to be suggested after an eojeol 'samseong(Samsung)' or a probability that an eojeol 'jusik (stocks)' is to be suggested after an eojeol 'samseong jeonja (Samsung electronics)' may be increased therein.

Afterward, when a user input of inputting an eojeol 'samseongjeonjajusikhoesa (Samsung electronics company limited)' 140 is received, because the eojeol 'samseongjeonjajusikhoesa (Samsung electronics company limited)' 140 is not included in the language dictionary, the language model may not have any information about the eojeol 'samseongjeonjajusikhoesa (Samsung electronics company limited)' 140. Thus, a predicted eojeol that may be input after the eojeol 'samseongjeonjajusikhoesa (Samsung electronics company limited)' 140 may not be recommended.

Even if an eojeol is not included in the language dictionary, the device 1000 according to some embodiments may recommend a predicted eojeol, based on a registered word included in the eojeol. For example, the device 1000 may detect a registered word 'samseong (Samsung)' or 'samseongjeonja (Samsung electronics)' from the eojeol 'samseongjeonjajusikhoesa (Samsung electronics company limited)' 140. The language model includes the registered word 'samseong (Samsung)' or 'samseongjeonja (Samsung electronics)', and indicates 'jusik (stocks)', 'sopeuteuweeo (software)', and 'dijiteolpeuraja (digitalplaza)' as eojeols having a high probability which are to be input after 'samseong (Samsung)' or 'samseongjeonja (Samsung electronics)', the device 1000 may recommend 'jusik(stocks)', 'sopeuteuweeo(software)', and 'dijiteolpeuraja (digitalplaza)' as predicted eojeols to be input after the eojeol 'samseongjeonjajusikhoesa (Samsung electronics company limited)' 140, based on the language model.

Figure 2:
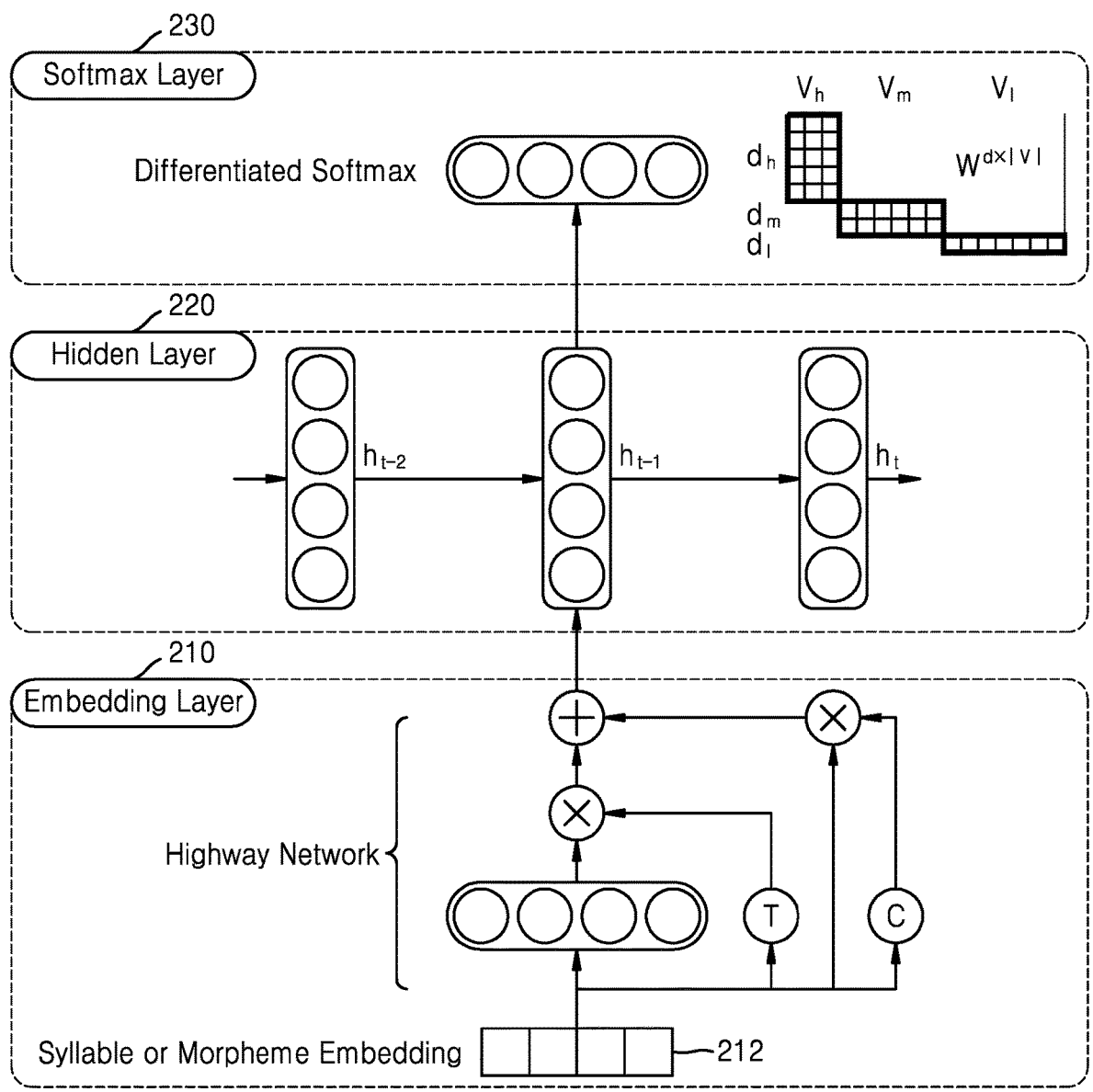
FIG. 2 is a diagram illustrating a method, performed by the device, of generating a language model, according to various example embodiments.

FIG. 2 is a diagram illustrating a method, performed by the device 1000, of generating a language model, according to various example embodiments.

Referring to FIG. 2, the device 1000 may generate and modify and refine a language model by sequentially applying an embedding layer 210, a hidden layer 220, and a softmax layer 230 to a text.

An input to the language model may be a group of given eojeols, and an output from the language model may be probabilities of eojeols that may be input after the group of given phrases.

The embedding layer 210 may be a layer in which an input text is broken into vectors 212 respectively corresponding to eojeols included in the text, and then the vectors 212 are set as an input to a hidden layer. For example, with respect to a text of 'geuneun (he) haksaengida (is a student)', the device 1000 may generate a vector with respect to 'geuneun (he)' and a vector with respect to 'haksaengida (is a student)' via the embedding layer 210, and then may set the generated two vectors as an input to a hidden layer.

In this case, even if an eojeol is not included in a language dictionary, the device 1000 may generate a vector 212 with respect to the eojeol that is not included in the language dictionary, based on a registered word existing in the eojeol. The device 1000 may detect the registered word included in the eojeol, based on syllables forming the eojeol. Embodiments thereof will be described in detail with reference to FIGS. 3 and 4.

The device 1000 may generate the vector 212 with respect to the eojeol, based on not only the registered word included in the eojeol but also based on a morpheme included in the eojeols. Embodiments thereof will be described in greater detail with reference to FIGS. 5 and 6.

The hidden layer 220 may be a neural network layer including, for example, recurrent neural networks (RNNs), in which, when given eojeols are sequentially input, a sequence of the input eojeols is trained.

The RNNs are an ideal architecture for modelling sequential data, and may model probabilities of registered words in the language dictionary, based on a given input context. When a language is modelled (RNN-LM) by using RNNs, a size of the RNNs may be determined based on a size of a language dictionary, e.g., the number of registered words in the language dictionary.

In an agglutinative language, the number of words or eojeols that may be set as registered words is significantly large compared to other languages, thus, when the agglutinative language is modeled by using RNNs, a size of the RNNs becomes huge and thus it is difficult to apply the RNNs to an actual product. In addition, because the RNNs have to be trained by using a dictionary including all available words and/or eojeols, it is difficult to exactly train the RNNs.

Even if an eojeol is not registered in the language dictionary, the device 1000 according to the present embodiment determines a predicted eojeol, based on a registered word existing in the eojeol, so that the device 1000 may recommend a predicted eojeol in a relatively exact manner even if a large number of eojeols are not present in the language dictionary.

The softmax layer 230 may be a layer in which a probability to be input after a most recently input eojeol is finally calculated for each of registered words in the language dictionary. For example, in the case that eojeols 'daeumju (next week)', 'woryoil (Monday)', 'hoeui (meeting)', and 'hoesa (company)' are included in the language dictionary, and a text 'daeumju woryoil (Monday of next week)' is received from a user, the device 1000 may calculate a probability that a sequence 'daeumju woryoil hoeui (meeting on Monday of next week)' may occur and a probability that a sequence 'daeumju woryoil hoesa (company on Monday of next week)' may occur.

In addition, the device 1000 may modify and refine the language model by adjusting parameters of the RNNs to have a highest probability that 'hoesa (company)' is to be input after 'daeumju woryoil (Monday of next week)' is input.

When a new eojeol is input, the device 1000 may add the new eojeol to the language dictionary, and may also modify and refine probability information about sequences between the added new eojeol and eojeols that are previously included in the language dictionary.

Figure 3:
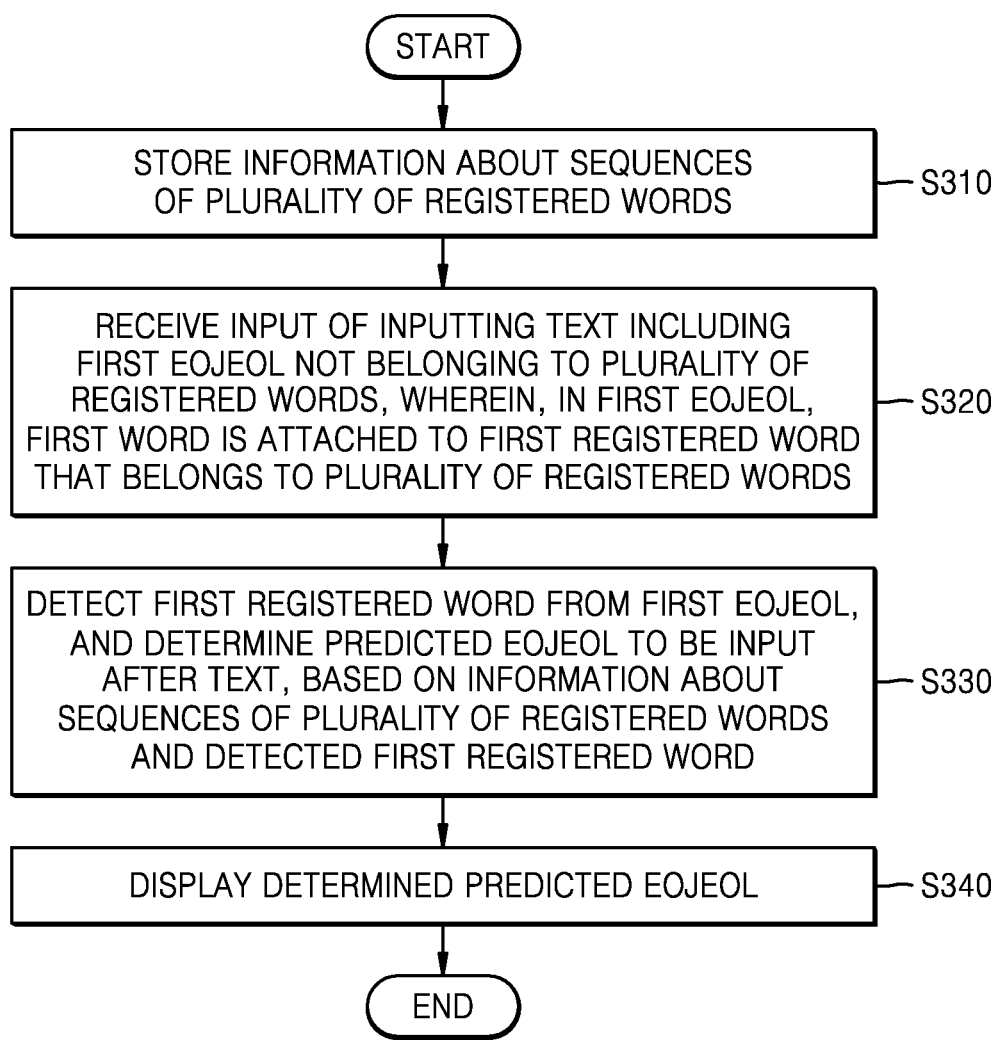
FIG. 3 is a flowchart illustrating a method, performed by the device, of determining a predicted eojeol to be input after a most recently input eojeol, according to various example embodiments.

FIG. 3 is a flowchart illustrating a method, performed by the device 1000, of determining a predicted eojeol to be input after a most recently input eojeol, according to various example embodiments.

In operation S310, the device 1000 may store information about sequences of a plurality of registered words.

The plurality of registered words may refer to words or eojeols included in a language dictionary. The device 1000 may detect a word or an eojeol from a text input by a user and may automatically store the detected word or eojeol as a registered word, or may receive a user input of inputting a word or an eojeol as a registered word.

The device 1000 may calculate (determine) probability information about sequences of the plurality of registered words in the language dictionary, based on a language model. In addition, when a text is input, the device 1000 may include, in the language dictionary, new words or new eojeols which are not present in the language dictionary, and may modify and refine the language model, based on the input text.

In operation S320, the device 1000 may receive an input of inputting a text including a first eojeol not belonging to the plurality of registered words, wherein, in the first eojeol, a first word is attached to a first registered word that belongs to the plurality of registered words.

The first eojeol may not be a registered word. That is, the first eojeol may not be included in the language dictionary. The first word may be a word or eojeol which is included in the language dictionary, or may be an eojeol that is not included in the language dictionary. In addition, the first word may be a word that may be independently used, or may be an affix that cannot be independently used. In addition, the first registered word may refer to a word or an eojeol which is included in the language dictionary.

For example, a word 'samseongjeonja (Samsung electronics)' may be included in the language dictionary, and the device 1000 may receive an input of a text 'samseongjeonjajusikhoesa (Samsung electronics company limited)'. In this case, the first registered word may be 'samseongjeonja (Samsung electronics)', the first word may be 'jusikhoesa (company limited)', and the first eojeol may be 'samseongjeonjajusikhoesa (Samsung electronics company limited)'. As another example, a word 'haksaeng (a student)' may be included in the language dictionary, and the device 1000 may receive an input of a text 'haksaengi (a student)'. In this case, the first registered word may be 'haksaeng (a student)', the first word may be 'i', and the first eojeol may be 'haksaengi (a student)'. As another example, a word 'sad' may be included in the language dictionary, and the device 1000 may receive an input of a text 'sadness'. In this case, the first registered word may be 'sad', the first word may be 'ness', and the first eojeol may be 'sadness'.

In operation S330, the device 1000 may detect the first registered word from the first eojeol, and may determine a predicted eojeol to be input after the text, based on the information about the sequences of the plurality of registered words and the detected first registered word.

The device 1000 may detect the first registered word from the first eojeol. For example, in the case that only 'samseong (Samsung)' and 'samseongjeonja (Samsung electronics)' are registered in the language dictionary, and 'samseongjeonjajusikhoesa (Samsung electronics company limited)' is not registered in the language dictionary, the device 1000 may detect 'samseong (Samsung)' and 'samseongjeonja (Samsung electronics)' from 'samseongjeonjajusikhoesa (Samsung electronics company limited)' that is the first eojeol. As another example, in the case that only 'haksaeng (a student)' and 'naneun (I)' are registered in the language dictionary, the device 1000 may detect 'naneun (I)' and 'haksaeng (a student)' from a text 'naneun haksaengida (I am a student)'.

The device 1000 may detect the first registered word from the first eojeol by applying a filter to a plurality of syllables forming the first eojeol, the filter corresponding to the first registered word. For example, in the case that 'haksaeng(a student)' is a registered word, the device 1000 may detect the registered word 'haksaeng(a student)' from 'haksaengida (am a student)' by applying a filter to 'haksaengida(am a student)' that are four syllables (i.e., hak/saeng/i/da (am a student)). The device 1000 may store respective filters with respect to the plurality of registered words included in the language dictionary. Thus, the number of the filters may correspond to the number of the plurality of registered words. Accordingly, when one eojeol is given, the device 1000 may determine whether registered words respectively corresponding to filters are present in the given eojeol, by applying each of the filters to the given eojeol. An embodiment in which a registered word is detected from an eojeol, based on at least one syllable, will be described below with reference to FIG. 4.

The device 1000 may detect at least one registered word including the first registered word from a text. For example, in the case that the device 1000 receives the text 'naneun haksaengida (I am a student)', the device 1000 may detect 'haksaeng (a student)' as the first registered word and 'naneun (I)' as a registered word.

The device 1000 may determine a registered word as a predicted eojeol, based on the information about the sequences of the plurality of registered words forming the language model that is the language dictionary, wherein the registered word has a highest probability of being input after a sequence of at least one registered word from among the plurality of registered words.

In this case, the device 1000 may determine the predicted eojeol by using a neural network algorithm.

The device 1000 may modify and refine parameters of a neural network in such a manner that, when the sequence of the at least one registered word detected from the text is input as an input value to the neural network because the device 1000 receives a user input of inputting a next eojeol of the text, the input next eojeol is output as an output value from the neural network.

In addition, the device 1000 may determine the predicted eojeol to be input after the text, based on at least one syllable included in the first eojeol together with the first registered word that is detected from the first eojeol. Embodiments in which a predicted eojeol is determined based on at least one syllable will be described in greater detail with reference to FIGS. 5 and 6.

In addition, the device 1000 may determine a plurality of predicted eojeols to be input after the text, based on the language model and at least one registered word detected from the text. In this case, the device 1000 may display a menu for receiving an input of selecting an eojeol from among the plurality of predicted eojeols, and upon receipt of a user input of selecting the eojeol from among the plurality of predicted eojeols, the device 100 may display the selected eojeol as an eojeol that is input after the text.

The device 1000 may store the first word as an affix with respect to the first registered word. In this case, when the first registered word is determined as the predicted eojeol, the device 1000 may display a menu for receiving an input of selecting one of the first registered word and the first eojeol.

For example, after an eojeol 'haksaengi (a student)' in which an affix 'i' is attached to the registered word 'haksaeng (a student)' is stored as a new registered word, when the registered word 'haksaeng (a student)' is determined as a predicted eojeol based on a user input, the device 1000 may provide not only 'haksaeng (a student)' but also 'haksaengi (a student)' as predicted eojeols. When the registered word 'haksaengi (a student)' is determined as the predicted eojeol, based on a user input, the device 1000 may provide not only 'haksaengi (a student)' but also 'haksaeng (a student)' as predicted eojeols.

In operation S340, the device 1000 may display the determined predicted eojeol.

When one or more predicted eojeols are determined, the device 1000 may display a menu for receiving an input of selecting one of the one or more predicted eojeols. The device 1000 may display the one or more predicted eojeols in an order according to calculated highest probabilities.

Figure 4:
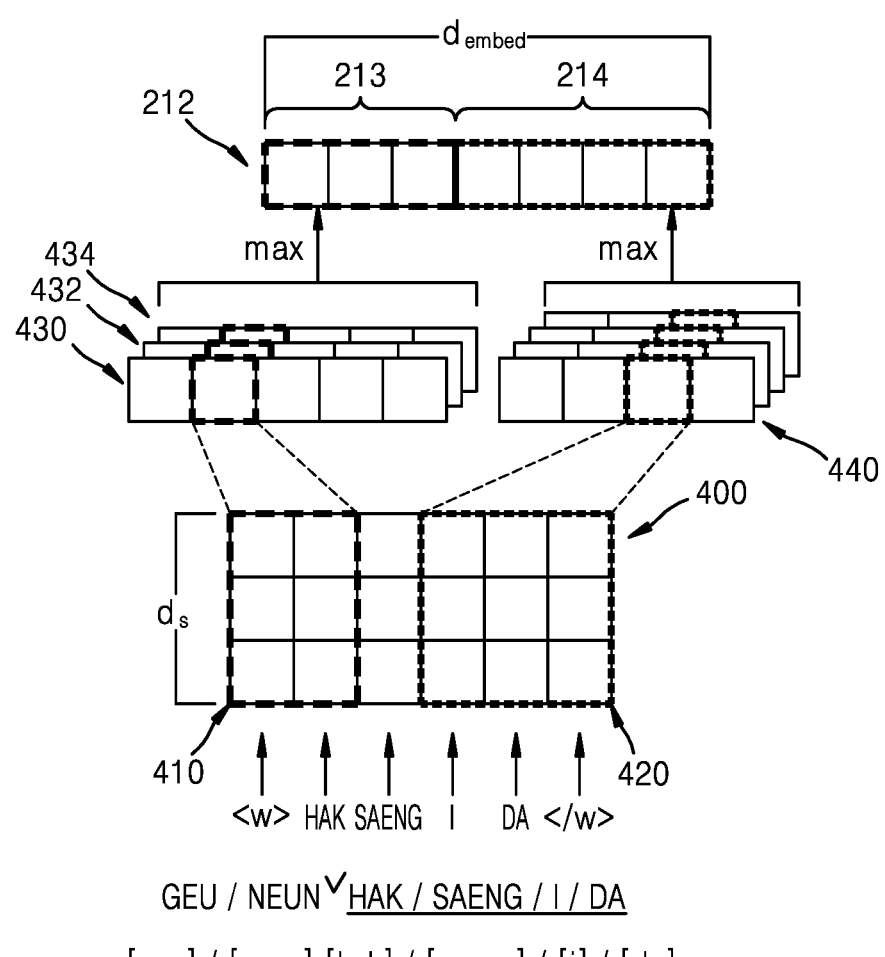
FIG. 4 is a diagram illustrating a method, performed by the device, of generating a vector corresponding to an eojeol, based on a registered word included in the eojeol, according to various example embodiments.

FIG. 4 is a diagram illustrating a method, performed by the device 1000, of generating the vector 212 (hereinafter, also referred to as the dembed vector 212) corresponding to an eojeol, based on a registered word included in the eojeol, according to some embodiments.

Referring to FIG. 4, the device 1000 may convert the eojeol to the dembed vector 212 indicating the registered word included in the eojeol.

For example, in the case that a text 'naneun haksaengida (I am a student)' is input, and a language dictionary includes registered words 'naneun (I)', 'haksaeng(a student)', 'seonsaengnim (teacher)', and 'gabang (bag)', the device 1000 may convert an eojeol 'naneun (I)' to a vector indicating the registered word 'naneun (I)', and information about an eojeol 'haksaengida (am a student)' to a vector indicating the registered word 'haksaeng (a student)'.

FIG. 4 may correspond to the embedding layer 210 of FIG. 2, and the dembed vector 212 indicating information about a registered word included in an eojeol may be input as an input value to the hidden layer 220 of FIG. 2.

The device 1000 may detect the registered word included in the eojeol, based on syllables forming the eojeol. For example, the device 1000 may detect the registered word included in the eojeol by applying a convolution neural network (CNN) filter to the syllables forming the eojeol.

In the case that one syllable is expressed as a vector of a $d_s$-dimension, an eojeol consisting of n syllables may be expressed as a matrix of $(n+2)*d_s$ size including elements indicating a start and an end. For example, in the case that a syllable is expressed as a three-dimensional vector, the eojeol 'haksaengida (am a student)' may be expressed as a 6×3 matrix 400.

The device 1000 may convolute first and second CNN filters 410 and 420 to the matrix 400 indicating the eojeol, thereby generating the dembed vector 212 indicating the registered word included in the eojeol. One CNN filter may be a filter to detect one registered word. For example, the first CNN filter 410 may be a filter to detect the registered word 'haksaeng(a student)', and the second CNN filter 420 may be a filter to detect the registered word 'seonsaengnim (teacher)'. In addition, a third CNN filter (not shown) may be a filter to detect the registered word 'gabang (bag)', and a fourth CNN filter (not shown) may be a filter to detect a registered word 'chingu (friend)'.

The device 1000 may store respective CNN filters with respective to respective registered words included in the language dictionary. The number of registered words included in the language dictionary may correspond to the number of CNN filters. A size of the dembed vector 212 generated from one eojeol may be the same as the number of registered words included in the language dictionary. For example, in the case that three two-syllable registered words are present in the language dictionary, and four three-syllable registered words are present in the language dictionary, the dembed vector 212 generated from one eojeol may have seven elements that are three elements corresponding to the two-syllable registered words and four elements corresponding to the three-syllable registered words.

The device 1000 may calculate a first vector 430 having five elements by convoluting the first CNN filter 410 of a 2×3 matrix which is for detecting 'haksaeng(a student)' to the 6×3 matrix 400 expressing the eojeol 'haksaengida(am a student)'. Equally, the device 1000 may generate a vector 432 corresponding to the registered word 'naneun (I)' and a vector 434 corresponding to the registered word 'gabang (bag)'. In this regard, because a word 'haksaeng (a student)' is positioned in second column and third column of the matrix 400 expressing the eojeol 'haksaengida (am a student)', a value of a second element from among the five elements of the first vector 430 is calculated as the largest one, and the largest value may be determined to be a value of an element corresponding to 'haksaeng(a student)' from among two-syllable elements 213 of the dembed vector 212.

The device 1000 may generate the vector 212 indicating whether the three two-syllable registered words exist in the eojeol.

The device 1000 may calculate a second vector 440 by convoluting the second CNN filter 420 to detect 'seonsaengnim (teacher)' to the matrix 400 expressing the 'haksaengida (am a student)'. The device 1000 may determine a largest value among elements in the second vector 440 to be a value of an element corresponding to 'seonsaengnim (teacher)' from among three-syllable elements 214 of the dembed vector 212.

The device 1000 may generate the vector 214 indicating whether the four three-syllable registered words exist in the eojeol.

Because the registered word 'seonsaengnim (teacher)' does not exist in the eojeol 'haksaengida (am a student)', the largest value from among values of the elements in the second vector 440 may be less than a reference value.

Accordingly, one element in the dembed vector 212 may correspond to one registered word, and in the case that a value of the element is greater than the reference value, a registered word corresponding to the element may be determined to be included in an eojeol.

The device 1000 may determine a predicted eojeol to be input after an input text, by sequentially inputting vectors as input values to a hidden layer according to an order of eojeols, wherein the vectors are calculated from the eojeols forming the text.

Accordingly, even if an input eojeol is not included in the language dictionary, the device 1000 may detect a registered word included in the eojeol, based on syllables forming the eojeol, and may determine a predicted eojeol that may be input after the input text, based on the detected registered word.

Figure 5:
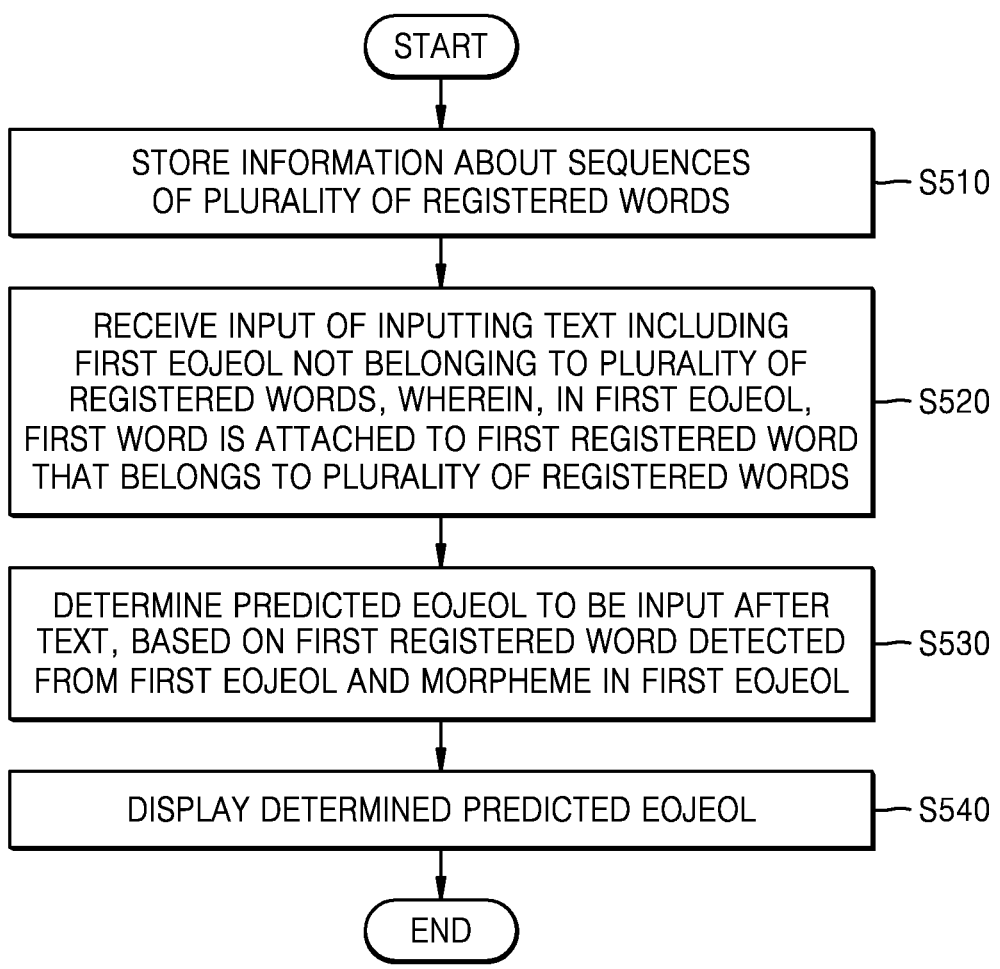
FIG. 5 is a flowchart illustrating a method, performed by the device, of generating a vector corresponding to an eojeol by taking into account not only a registered word in the eojeol but also a morpheme in the eojeol, according to various example embodiments.

FIG. 5 is a flowchart illustrating a method, performed by the device 1000, of generating a vector corresponding to an eojeol by taking into account not only a registered word in the eojeol but also a morpheme in the eojeol, according to various example embodiments.

In operation S510, the device 1000 may store information about sequences of a plurality of registered words. In operation S520, the device 1000 may receive an input of inputting a text including a first eojeol not belonging to the plurality of registered words, wherein, in the first eojeol, a first word is attached to a first registered word that belongs to the plurality of registered words.

Operations S510 through S520 may be described with reference to operations S310 through S320 of FIG. 3.

In operation S530, the device 1000 may determine a predicted eojeol to be input after the text, based on the first registered word detected from the first eojeol and a morpheme in the first eojeol.

For example, in the case that the first eojeol indicates 'haksaengida (am a student)', the device 1000 may detect 'haksaeng (a student)' that is a registered word from the first eojeol 'haksaengida(am a student)', and may detect 'haksaeng(a student)' and 'ida(am)' which are morphemes in 'haksaengida(am a student)'. Accordingly, the device 1000 may generate a vector corresponding to 'haksaengida(am a student)', based on not only the registered word 'haksaeng(a student)' but also 'haksaeng(a student)' and 'ida(am)' which are the morphemes in the first eojeol, so that the device 1000 may recommend a more exact predicted eojeol.

In operation S540, the device 1000 may display the determined predicted eojeol. Operation S540 may be described with reference to operation S340 of FIG. 3.

Figure 6:
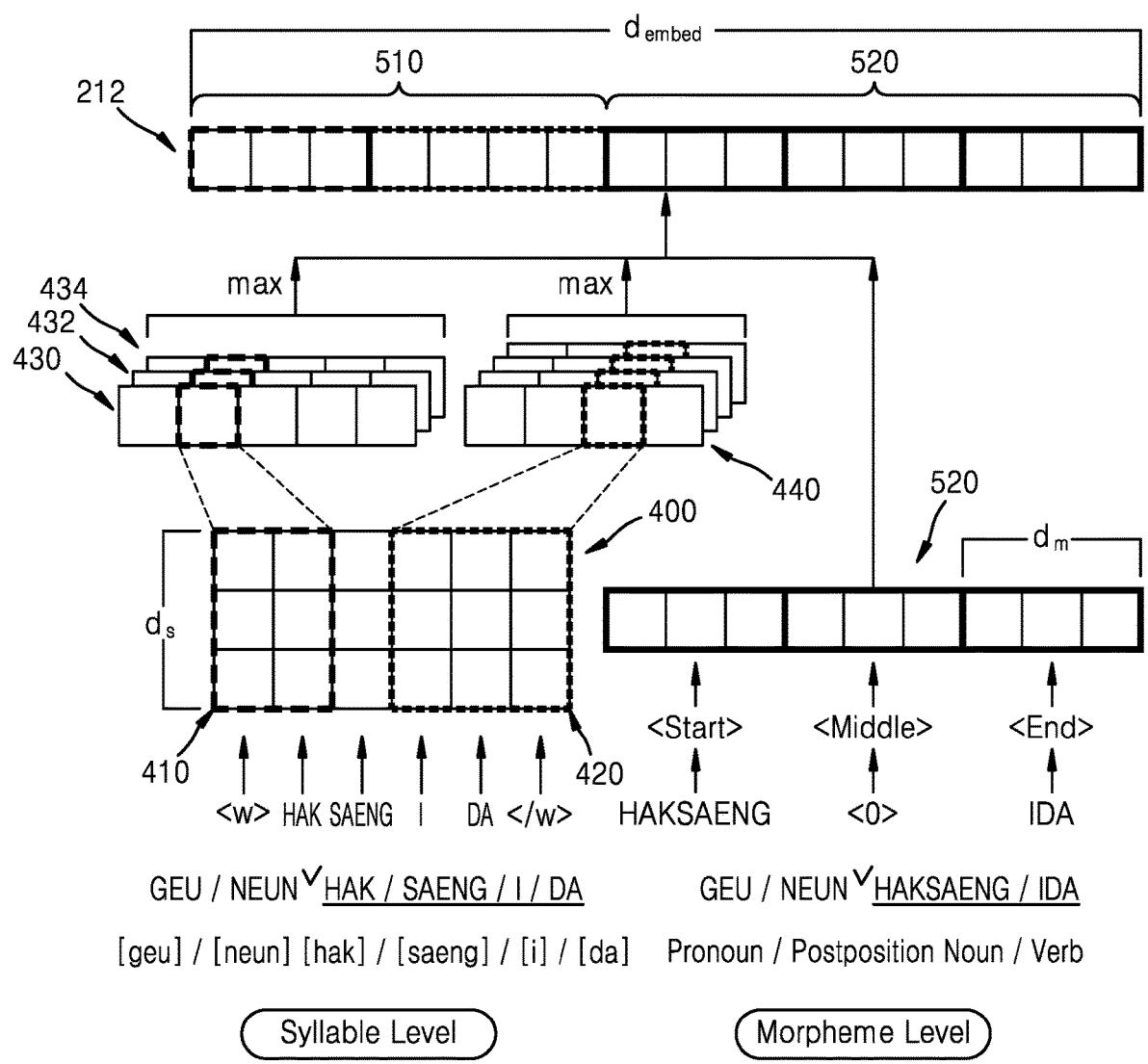
FIG. 6 is a diagram illustrating a method, performed by the device, of generating a vector corresponding to an eojeol by taking into account not only a registered word in the eojeol but also morphemes in the eojeol, according to various example embodiments.

FIG. 6 is a diagram illustrating a method, performed by the device 1000, of generating a vector corresponding to an eojeol by taking into account not only a registered word in the eojeol but also morphemes in the eojeol, according to various example embodiments.

Referring to FIG. 6, the device 1000 may generate a vector 212 corresponding to an eojeol by adding a first vector 510 to a second vector 520, wherein the first vector 510 indicates information about the registered word in the eojeol and the second vector 520 indicates information about the morphemes in the eojeol, the first vector 510 and the second vector 520 being described with reference to FIG. 4.

The device 1000 may divide the eojeol, based on the morphemes, and may express the divided morphemes as vectors, thereby generating the second vector 520 indicating a meaning of the eojeol.

A morpheme may refer to the smallest meaningful unit of a language. For example, morphemes in an eojeol 'haksaengida (am a student)' may be 'haksaeng (a student)' and 'ida (am)'. In this case, 'haksaeng (a student)' is a noun, and 'ida (am)' is a verb. Also morphemes in an eojeol 'geuneun (he)' may be 'geu (he)' and 'neun'. In this case, 'geu (he)' is a pronoun, and 'neun' is a postposition.

As described above, In the Korean language, each of most eojeols may be divided into no more than three morphemes. Accordingly, the device 1000 may generate the second vector 520 corresponding to the eojeol by connecting three vectors corresponding to three morphemes. In this case, one morpheme may be expressed as one vector dm having three elements.

Figure 7:
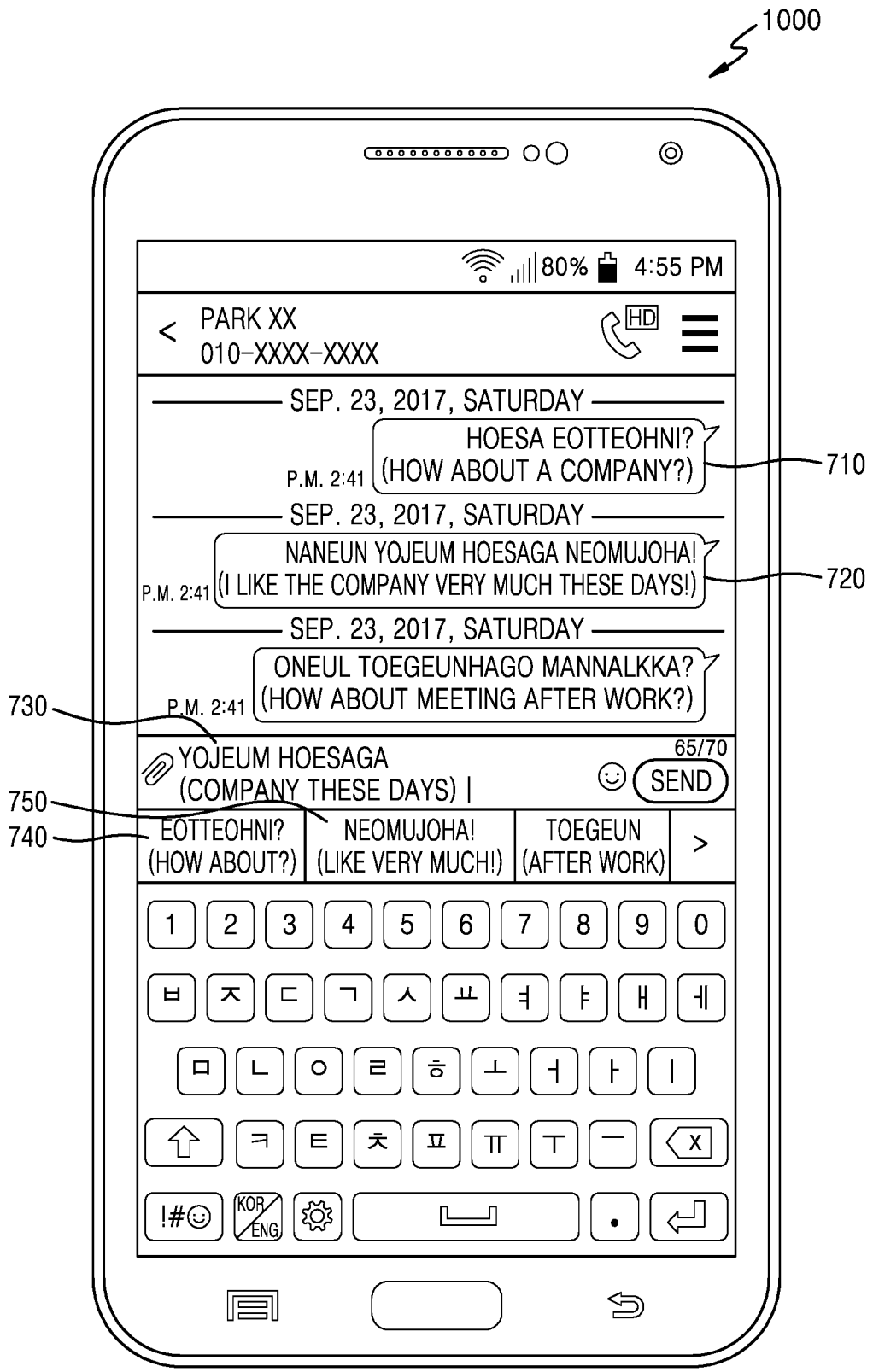
FIG. 7 is a diagram illustrating a method, performed by the device, of recommending a predicted eojeol, according to various example embodiments.

FIG. 7 is a diagram illustrating a method, performed by the device 1000, of recommending a predicted eojeol, according to various example embodiments.

Referring to FIG. 7, the device 1000 may modify and refine a language model, based on not only an input eojeol but also a registered word in the input eojeol.

For example, the device 1000 may receive a user input of inputting a text 'hoesa eotteohni? (How about a company?)' 710, a text 'naneun yojeum hoesaga neomujoha! (I like the company very much these days!)' 720, and a text 'oneul toegeunhago mannalkka? (How about meeting after work?)'. In the case that a registered word 'hoesa (company)' is present in a language dictionary in the device 1000, the device 1000 may modify and refine the language model to increase a probability of a sequence in which an eojeol 'eotteohni? (How about?)' is to be input after 'hoesa (company)' based on a sentence 'hoesa eotteohni? (How about a company?)'.

When the device 1000 receives a sentence 'naneun yojeum hoesaga neomujoha! (I like the company very much these days!)', the device 1000 may detect a registered word 'hoesa (company)' from an eojeol 'hoesaga (company)', and may modify and refine the language model to increase a sequence in an order of 'naneun (I)', 'yojeum (these days)', 'hoesaga (company)', and 'neomujoha! (like very much!)', and a probability of a sequence in an order of 'naneun (I)', 'yojeum (these days)', 'hoesa (company)', and 'neomujoha! (like very much!)'.

Accordingly, when a user inputs a text 'yojeum hoesaga (company these days)' 730, the device 1000 may recommend, as a predicted eojeol, not only 'eotteohni? (How about?)' 740 but also 'neomujoha! (like very much!)' 750.

Figure 8A:
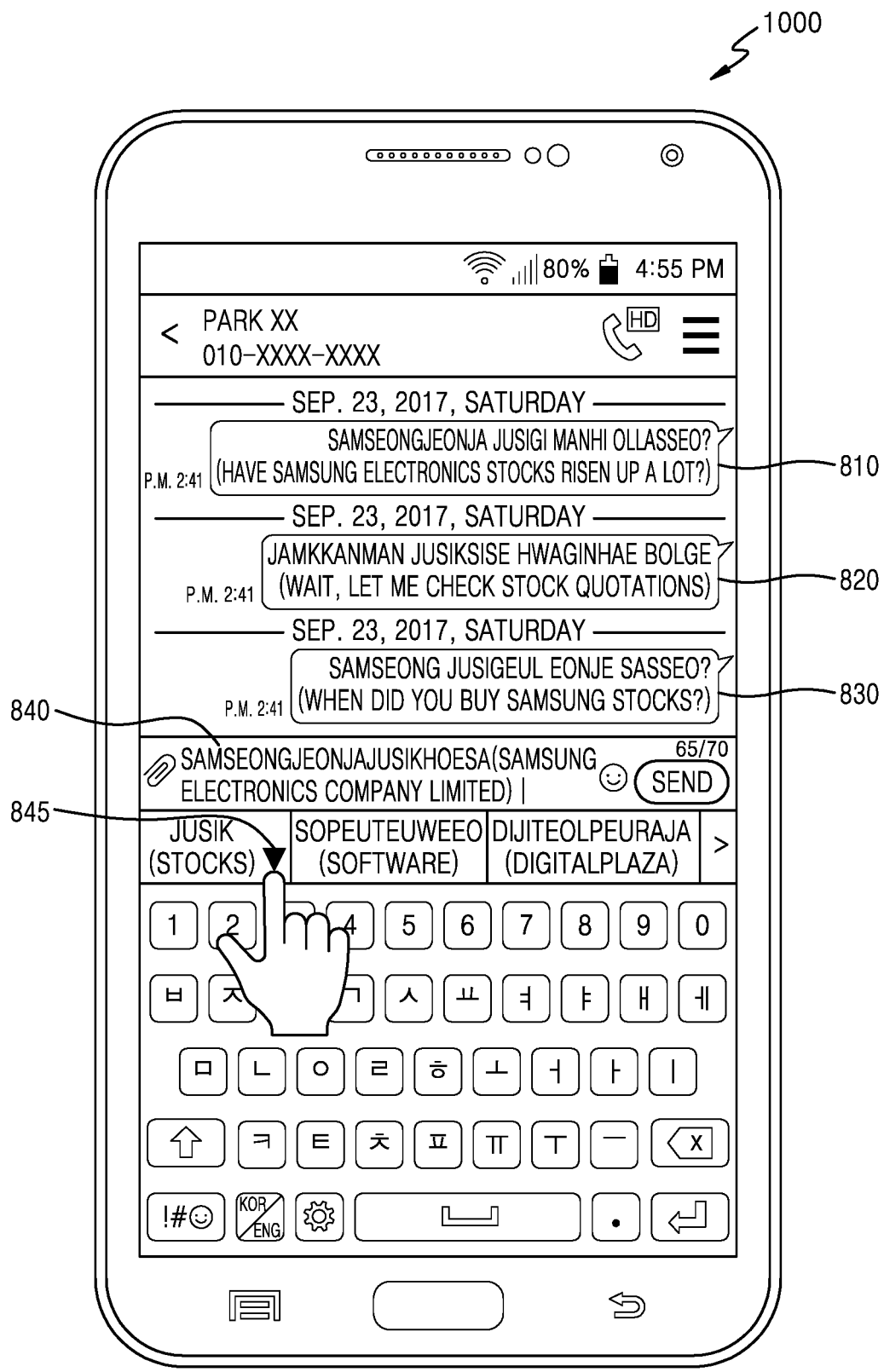
FIGS. 8A and 8B are diagrams illustrating a method, performed by the device, of recommending an affix corresponding to a registered word while recommending the registered word as a predicted eojeol, according to various example embodiments.
Figure 8B:
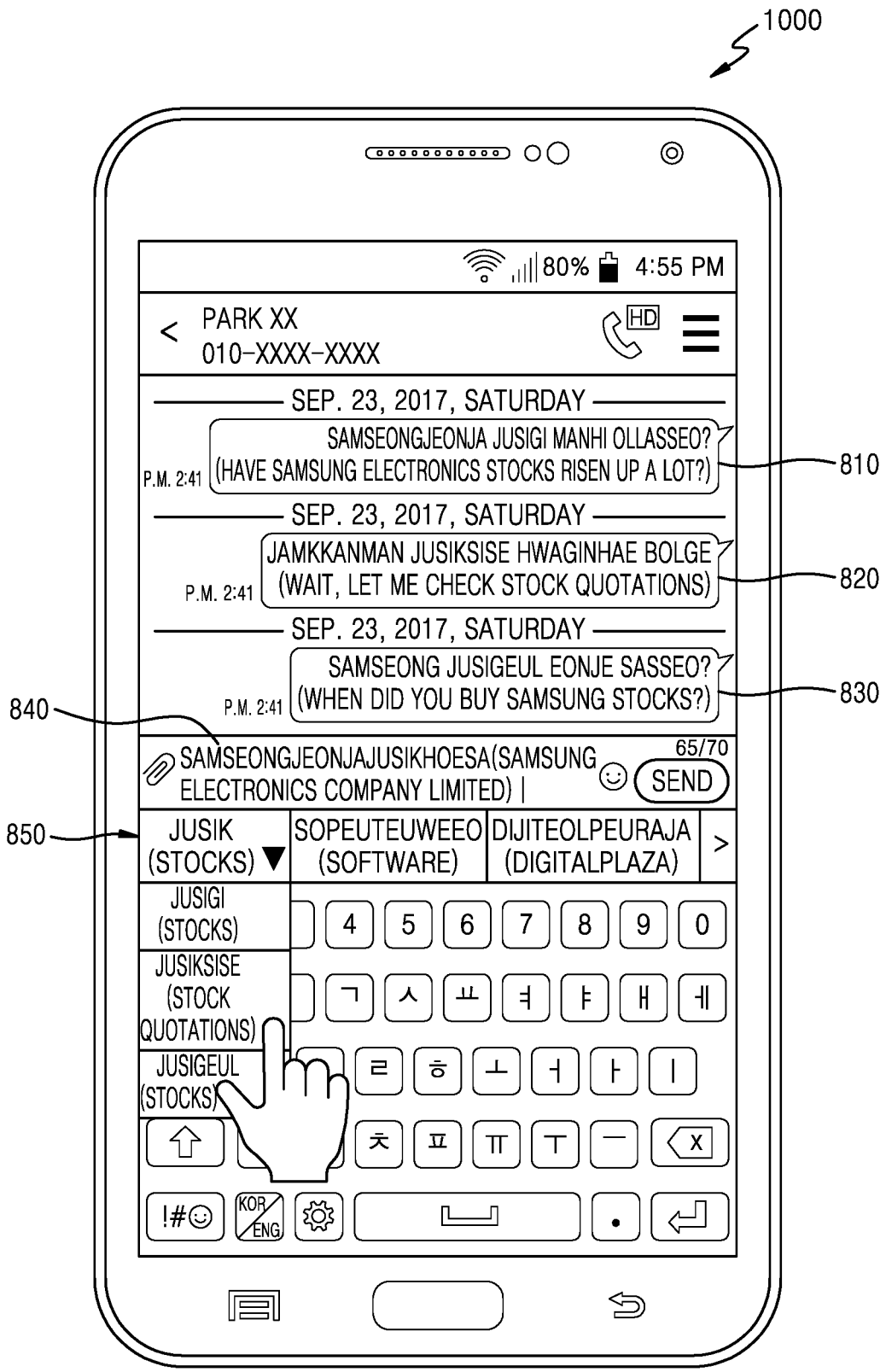

FIGS. 8A and 8B are diagrams illustrating a method, performed by the device 1000, of recommending an affix corresponding to a registered word while recommending the registered word as a predicted eojeol, according to some embodiments.

Referring to FIG. 8A, when the device 1000 detects a registered word from an eojeol, the device 1000 may store a word attached to the registered word, as an affix of the registered word.

For example, when a sentence 'samseongjeonja jusigi manhi ollasseo? (Have Samsung electronics stocks risen up a lot?)' 810 is received, the device 1000 may modify and refine the language model to increase a sequence in an order of 'samseongjeonja (Samsung electronics)', 'jusigi (stocks)', 'manhi (a lot)', and ollasseo? (risen up?)'. In this case, the device 1000 may detect a registered word 'jusik (stocks)' from an eojeol 'jusigi (stocks)', and may store 'i' as an affix with respect to 'jusik (stocks)'.

Equally, when a sentence 'jamkkanman jusiksise hwaginhae bolge (Wait, let me check stock quotations)' 820 is received, the device 1000 may detect the registered word 'jusik (stocks)' from an eojeol 'jusiksise (stock quotations)', and may store 'sise (quotations)' as an affix with respect to 'jusik (stocks)'.

In addition, when a sentence 'samseong jusigeul eonje sasseo? (When did you buy Samsung stocks?)' 830 is received, the device 1000 may detect the registered word 'jusik (stocks)' from an eojeol 'jusigeul (stocks)', and may store 'eul' as an affix with respect to 'jusik (stocks)'.

Afterward, when an input of inputting an eojeol 'samseongjeonjajusikhoesa (Samsung electronics company limited)' 840 is received, the device 1000 may detect a registered word 'samseongjeonja (Samsung electronics)' from the eojeol 'samseongjeonjajusikhoesa (Samsung electronics company limited)' 840, and may determine 'jusik (stocks)' as a predicted eojeol to be input after the detected registered word.

In addition, the device 1000 may display 'jusik (stocks)' as the predicted eojeol.

In addition, the device 1000 may display a menu icon 845 for receiving an input of selecting one of 'jusigi (stocks)', 'jusiksise (stock quotations)', and 'jusigeul (stocks)' which are obtained by attaching the affixes 'i', 'sise (quotations)', and 'eul' to 'jusik (stocks)', the affixes being stored to correspond to 'jusik (stocks)'.

Referring to FIG. 8B, when an input of selecting the menu icon 845 is received, the device 1000 may display a menu

850 for receiving an input of selecting one of 'jusigi (stocks)', 'jusiksise (stock quotations)', and 'jusigeul (stocks)'.

When a user input of selecting 'jusiksise (stock quotations)' is received, the device 1000 may display 'jusiksise (stock quotations)' as a next eojeol of the 'samseongjeon-jajusikhoesa (Samsung electronics company limited)' 840.

Figure 9:
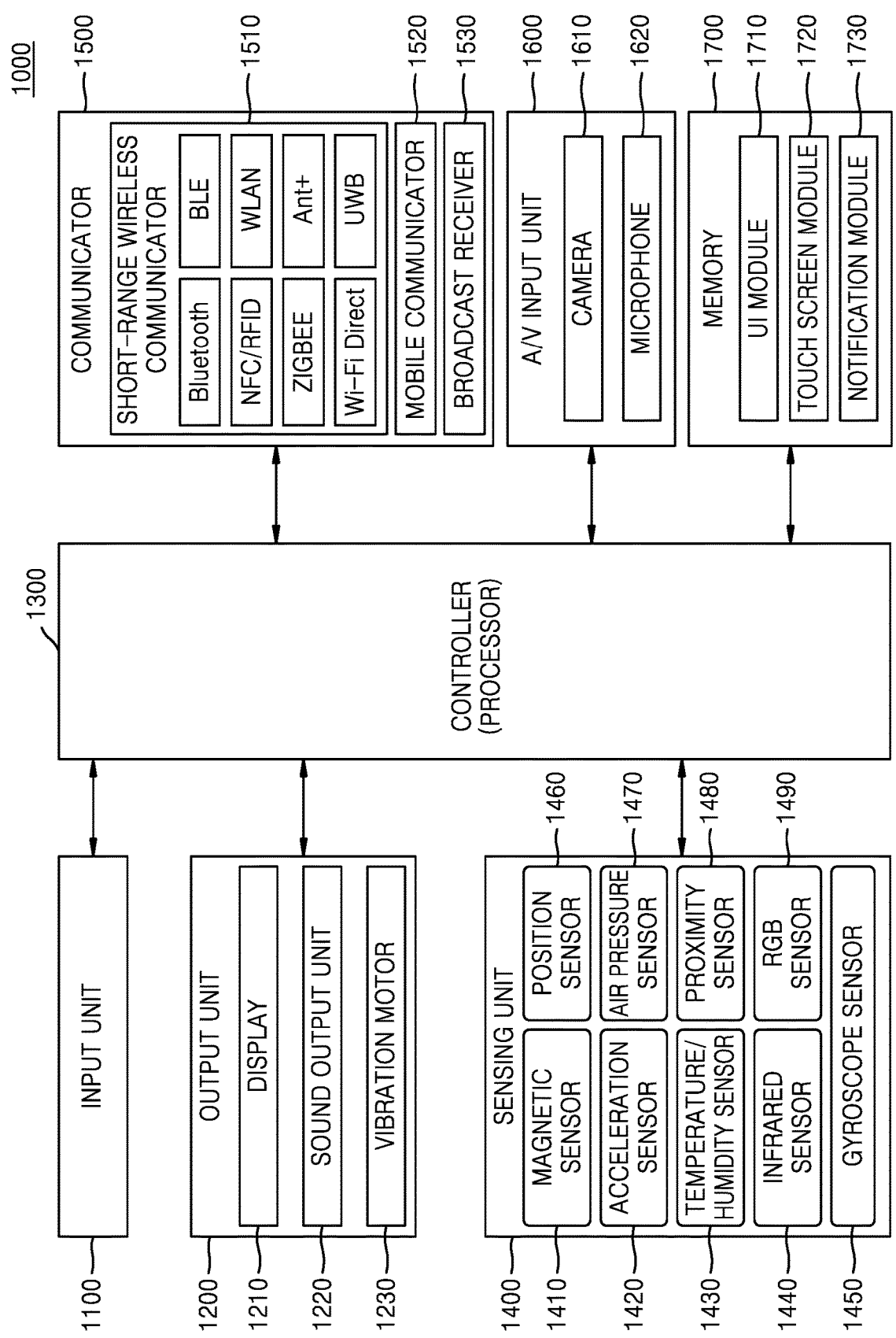
FIG. 9 is a block diagram of the device, according to some embodiments.

FIG. 9 is a block diagram illustrating the device 1000, according to various example embodiments.

As illustrated in FIG. 9, the device 1000 may include a controller (e.g., including processing circuitry) 1300 (also referred to as the processor 1300), an input unit (e.g., including input circuitry) 1100, and a display 1210. However, not all elements shown in FIG. 9 are necessary elements. That is, the device 1000 may be embodied with more elements than the elements shown in FIG. 9 or may be embodied with fewer elements than the elements shown in FIG. 9.

The input unit 1100 refers, for example, to a unit, including input circuitry, through which an input, such as a user input, inputs data to control the device 1000. For example, the user input unit 1100 may include various input circuitry, such as, for example, but is not limited to, a key pad, a dome switch, a touch pad (a touch capacitive type touch pad, a pressure resistive type touch pad, an infrared beam sensing type touch pad, a surface acoustic wave type touch pad, an integral strain gauge type touch pad, a piezo effect type touch pad, or the like), a jog wheel, and a jog switch, or the like. In addition, the user input unit 1100 may receive a user input of inputting a text. For example, the user input unit 1100 may receive a user input of a text input via a touch keyboard.

An output unit 1200 may include various output circuitry and output an audio signal, a video signal, or a vibration signal, and may include the display 1210, a sound output unit 1220, and a vibration motor 1230.

The display 1210 displays and outputs information processed in the device 1000. For example, the display 1210 may display a text input by the user. In addition, the display 1210 may display a predicted eojeol determined by the controller 1300.

When the display 1210 and a touch pad form a mutual layer structure and then are formed as a touch screen, the display 1210 may be used as both an output device and input device. The display 1210 may include, for example, and without limitation, at least one of liquid crystal display (LCD), a thin film transistor-liquid crystal display (TFT-LCD), an organic light-emitting diode (OLED) display, a flexible display, a three-dimensional (3D) display, and an electrophoretic display, or the like.

The sound output unit 1220 may include various output circuitry and output audio data that is received from a communicator 1500 or is stored in a memory 1700. The vibration motor 1230 may output a vibration signal.

The controller 1300 may include various processing circuitry and generally controls all operations of the device 1000. For example, the controller 1300 may control the user input unit 1100, the output unit 1200, a sensing unit 1400, the communicator (e.g., including communication circuitry) 1500, an audio/video (NV) input unit (e.g., including AN input circuitry) 1600, or the like by executing programs stored in the memory 1700. The controller 1300 may control operations of the device 1000 to perform functions of the device 1000 which are described with reference to FIGS. 1 through 8B.

In more detail, when the controller 1300 receives an input of inputting a text including a first eojeol not belonging to a plurality of registered words, wherein, in the first eojeol, a first word is attached to a first registered word that belongs to the plurality of registered words, the controller 1300 may detect the first registered word from the first eojeol, and may determine a predicted eojeol to be input after the text, based on information about sequences of the plurality of registered words and the detected first registered word.

In addition, the controller 1300 may detect the first registered word from the first eojeol by applying a plurality of filters corresponding to the plurality of registered words to a plurality of syllables forming the first eojeol.

In addition, the controller 1300 may detect at least one registered word including the first registered word from the text, and may determine a registered word as a predicted eojeol, based on the information about the sequences of the plurality of registered words, wherein the registered word has a highest probability of being input after a sequence of at least one registered word from among the plurality of registered words.

In addition, the controller 1300 may determine an eojeol by using a neural network algorithm, wherein the eojeol has a highest probability of being input after the sequence of the at least one registered word from among the plurality of registered words.

In addition, the controller 1300 may modify and refine parameters of a neural network in such a manner that, when the sequence of the at least one registered word detected from the text is input as an input value to the neural network because a user input of inputting a next eojeol of the text is received, the input next eojeol is output as an output value from the neural network.

In addition, the controller 1300 may determine the predicted eojeol to be input after the text, based on the first registered word detected from the first eojeol in the text and at least one morpheme included in the first eojeol.

In addition, the controller 1300 may determine a plurality of predicted eojeols to be input after the text, based on the information about the sequences of the plurality of registered words and the detected first registered word.

In addition, when an input of selecting one of the plurality of predicted eojeols is received, the controller 1300 may input the selected eojeol as a next eojeol of the text.

In addition, the controller 1300 may store the first word as an affix with respect to the first registered word, and when the first registered word is determined as the predicted eojeol, the controller 1300 may control the display 1210 to display a menu for receiving an input of selecting one of the first registered word and the first eojeol.

The sensing unit 1400 may sense a state of the device 1000 or a status around the device 1000 and may transfer sensed information to the controller 1300.

The sensing unit 1400 may include various sensing circuitry and/or sensors, such as, for example, but is not limited to, at least one of a magnetic sensor 1410, an acceleration sensor 1420, a temperature/humidity sensor 1430, an infrared sensor 1440, a gyroscope sensor 1450, a position sensor (e.g., a global positioning system (GPS)) 1460, an air pressure sensor 1470, a proximity sensor 1480, and an RGB sensor (e.g., a luminance sensor) 1490. Functions of the sensors may be intuitionally deduced by one of ordinary skill in the art by referring to names of the sensors, and thus, detailed descriptions thereof are not included here.

The communicator 1500 may include various communication circuitry including one or more elements allowing communication between the device 1000 and an external device. For example, the communicator 1500 may include various communication circuitry and/or chips, such as, for example, and without limitation, a short-range wireless communicator 1510, a mobile communicator 1520, and a broadcast receiver 1530.

The short-range wireless communicator 1510 may include, but is not limited to, circuitry such as, a Bluetooth communicator, a Bluetooth Low Energy (BLE) communicator, a near field communication (NFC)/RFID unit, a WLAN (Wi-Fi) communicator, a ZigBee communicator, an infrared Data Association (IrDA) communicator, a Wi-Fi Direct (WFD) communicator, a ultra wideband (UWB) communicator, and an Ant+ communicator.

The mobile communicator 1520 exchanges a wireless signal with at least one of a base station, an external terminal, and a server on a mobile communication network. The wireless signal may include various types of data according to communication of a sound call signal, a video call signal, or a text/multimedia message.

The broadcast receiver 1530 receives a broadcast signal and/or information related to a broadcast from the outside through a broadcast channel. The broadcast channel may include a satellite channel and a ground wave channel. In another embodiment, the device 1000 may not include the broadcast receiver 1530.

The A/V input unit 1600 may include various A/V input circuitry and receive an input of an audio signal or a video signal and may include, for example, and without limitation, a camera 1610, a microphone 1620, or the like.

The memory 1700 may store a program for processing and controlling the controller 1300, and may store a plurality of pieces of data that are input to or output from the device 1000.

The memory 1700 may include a storage medium of at least one type selected from a flash memory, a hard disk, a multimedia card type memory, a card type memory such as a secure digital (SD) or xD-Picture (xD) card memory, a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

The programs stored in the memory 1700 may be classified into a plurality of modules according to their functions, for example, into a user interface (UI) module 1710, a touch screen module 1720, a notification module 1730, or the like.

The memory 1700 may store a language dictionary including a plurality of registered words. In addition, the memory 1700 may store a language model that is probability information about sequences of the plurality of registered words in the language dictionary.

The UI module 1710 may provide a specialized UI or graphical user interface (GUI) associated with the device 1000 for each application. The touch screen module 1720 may detect a user's touch gesture on the touch screen and may transmit information related to the touch gesture to the controller 1300. The touch screen module 1720 may recognize and analyze a touch code. The touch screen module 1720 may be embodied as separate hardware including a controller.

Some embodiments may be embodied as a recording medium, e.g., a program module to be executed in computers, which includes computer-readable instructions. The computer-readable medium may include any usable medium that may be accessed by computers, volatile and non-volatile medium, and detachable and non-detachable medium. Also, the computer-readable medium may include a computer storage medium and a communication medium. The computer storage medium includes all volatile and non-volatile media, and detachable and non-detachable media which are technically implemented to store information including computer readable instructions, data structures, program modules or other data. The communication medium includes computer-readable instructions, a data structure, a program module, other data as modulation-type data signals such as carrier signals, or other transmission mechanism, and includes other information transmission media.

Throughout the specification, the term "unit" may indicate a hardware component such as a processor or a circuit, and/or may indicate a software component that is executed by a hardware configuration such as a processor.

It will be apparent to one of ordinary skill in the art that the present disclosure may be easily embodied in many different forms without changing the technical concept or essential features of the disclosure. Thus, it should be understood that the embodiments described herein should be considered in a descriptive sense only and not for purposes of limitation. For example, configuring elements that are singular forms may be executed in a distributed fashion, and also, configuring elements that are distributed may be combined and then executed.

While various example embodiments have been described with reference to the figures, it will be understood by those of ordinary skill in the art that various changes in form and details may be made therein without departing from the spirit and scope as defined by the following claims.

What is claimed is:

1. A device comprising:
   a display;
   a memory storing information about sequences about a plurality of registered words; and
   at least one processor configured to:
   receive a user input including a text comprising a first combined word,
   detect a first portion corresponding to at least one word of the plurality of registered words, from the first combined word,
   determine a plurality of predicted words to be input in succession to the text via a neural network, based on the information about the sequences about the plurality of registered words and the detected first portion, including modify and refine parameters for the neural network so as to train the neural network so that next words can be output as an output value from the neural network,
   control the display to display a menu for receiving an input selecting one of the plurality of the predicted words predicted via the neural network
   obtain an input selecting a word from among the plurality of predicted words, and
   input the selected word in succession to the text via the neural network,
   wherein the first combined word comprises the first portion corresponding to at least one word of the plurality of registered words and a second portion not corresponding to any words of the plurality of registered words.

2. The device of claim 1, wherein the at least one processor is further configured to detect the first portion corresponding to at least one word of the plurality of registered words from the first combined word by applying a plurality of filters corresponding to the plurality of registered words to a plurality of syllables forming the first combined word.

3. The device of claim 1, wherein the at least one processor is further configured to detect at least one registered word comprising the first portion from the text, and to determine a registered word as the predicted word, based on the information about the sequences about the plurality of registered words, wherein the registered word has a highest probability of being input after a sequence about the at least one registered word from among the plurality of registered words.

4. The device of claim 3, wherein the at least one processor is further configured to determine the predicted word using a neural network algorithm, wherein the predicted word has a highest probability of being input after the sequence about the at least one registered word from among the plurality of registered words.

5. The device of claim 4, wherein the at least one processor is further configured to:
  receive an input of inputting a next word of the text, and
  modify and refine parameters of the neural network algorithm for the neural network so that, when the sequence about the at least one registered word detected from the text is input as an input value to the neural network, the next word is output as an output value from the neural network.

6. The device of claim 1, wherein
  the at least one processor is further configured to determine a plurality of predicted words to be input in succession to the text, based on the information about the sequences about the plurality of registered words and the detected first portion, and
  the display is further configured to display a menu for receiving an input selecting one of the plurality of predicted words, and when an input selecting an word from among the plurality of predicted words is received, the at least one processor is further configured to input the selected word in succession to the text.

7. The device of claim 1, wherein the at least one processor is further configured to store the first portion as an affix with respect to the at least one word of the plurality of registered words, and when the at least one word of the plurality of registered words is determined as the predicted word, the at least one processor is further configured to control the display to display a menu for receiving an input selecting one of the at least one word of the plurality of registered words and the first combined word.

8. A method of recommending a word, the method comprising:
  storing, in memory, information about sequences about a plurality of registered words;
  receiving, by at least one processor, a user input including a text comprising a first combined word;
  detecting a first portion corresponding to at least one word of the plurality of registered words via a neural network, from the first combined word, and determining a predicted word to be input in succession to the text, based on the information about the sequences about the plurality of registered words and the detected first portion, including modifying and refining parameters for the neural network so as to train the neural network so that next words can be output as an output value from the neural network; and
  displaying, on a display, the predicted word,
  wherein the first combined word comprises the first portion corresponding to at least one word of the plurality of registered words and a second portion not corresponding to any words of the plurality of registered words.

9. The method of claim 8, wherein the detecting of the first portion corresponding to at least one word of the plurality of registered words comprises detecting the first portion corresponding to at least one word of the plurality of registered words from the first combined word by applying a plurality of filters corresponding to the plurality of registered words to a plurality of syllables forming the first combined word.

10. The method of claim 8, wherein the determining of the predicted word comprises detecting at least one registered word comprising the first portion from the text, and determining a registered word as the predicted word, based on the information about the sequences about the plurality of registered words, wherein the registered word has a highest probability of being input after a sequence about the at least one registered word from among the plurality of registered words.

11. The method of claim 10, wherein the determining of the predicted word comprises determining the predicted word using a neural network algorithm, wherein the predicted word has a highest probability of being input after the sequence about the at least one registered word from among the plurality of registered words.

12. The method of claim 11, further comprising:
  receiving, by the at least one processor, an input including a next word of the text; and
  modifying and refining parameters of the neural network algorithm for the neural network so that, when the sequence about the at least one registered word detected from the text is input as an input value to the neural network, the next word is output as an output value from the neural network.

13. The method of claim 8, wherein the determining of the predicted word comprises determining the predicted word to be input in succession to the text, based on the first portion detected from the first combined word and at least one morpheme included in the first combined word.

14. The method of claim 8, wherein the determining of the predicted word comprises determining a plurality of predicted words to be input after the text, based on the information about the sequences about the plurality of registered words and the detected first portion, and
  the method further comprises displaying, on the display, a menu for receiving an input selecting one of the plurality of predicted words, and when an input selecting an word from among the plurality of predicted words is received, inputting the selected word in succession to the text.

15. The method of claim 8, further comprising:
  storing, in the memory, the first portion as an affix with respect to the at least one word of the plurality of registered words; and
  displaying, on the display, a menu for receiving an input selecting one of the at least one word of the plurality of registered words and the first combined word when the at least one word of the plurality of registered words is determined as the predicted word.

16. A non-transitory computer-readable recording medium having recorded thereon a program for executing, on a computer, a method comprising:
  storing information about sequences about a plurality of registered words;
  receiving a user input including a text comprising a first combined word;
  detecting a first portion corresponding to at least one word of the plurality of registered words, from the first combined word;
  determining a predicted word to be input in succession to the text via a neural network, based on the information about the sequences about the plurality of registered words and the detected first portion, including modifying and refining parameters for the neural network so as to train the neural network so that next words can be output as an output value from the neural network; and
displaying, on a display, the predicted word,
wherein the first combined word comprises the first portion corresponding to at least one word of the plurality of registered words and a second portion not corresponding to any words of the plurality of registered words.

* * * * *